(12) United States Patent
Wakabayashi et al.

(10) Patent No.: US 9,314,773 B2
(45) Date of Patent: Apr. 19, 2016

(54) PALLADIUM CATALYST

(71) Applicant: Mitsui Mining & Smelting Co., Ltd., Tokyo (JP)

(72) Inventors: Takashi Wakabayashi, Ageo (JP); Yosuke Shibata, Ageo (JP); Yunosuke Nakahara, Ageo (JP); Kiyotaka Yasuda, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 14/389,059

(22) PCT Filed: Feb. 15, 2013

(86) PCT No.: PCT/JP2013/053614
§ 371 (c)(1),
(2) Date: Sep. 29, 2014

(87) PCT Pub. No.: WO2013/145920
PCT Pub. Date: Oct. 3, 2013

(65) Prior Publication Data
US 2015/0087504 A1 Mar. 26, 2015

(30) Foreign Application Priority Data
Mar. 30, 2012 (JP) ................. 2012-080847

(51) Int. Cl.
| | | |
|---|---|---|
| *B01J 23/00* | (2006.01) | |
| *B01J 23/02* | (2006.01) | |
| *B01J 23/08* | (2006.01) | |
| *B01J 23/10* | (2006.01) | |
| *B01J 23/42* | (2006.01) | |
| *B01J 23/44* | (2006.01) | |
| *B01J 21/04* | (2006.01) | |
| *B01J 23/63* | (2006.01) | |
| *F01N 3/10* | (2006.01) | |
| *B01D 53/94* | (2006.01) | |
| *B01J 35/00* | (2006.01) | |
| *B01J 35/10* | (2006.01) | |

(52) U.S. Cl.
CPC .............. *B01J 23/63* (2013.01); *B01D 53/944* (2013.01); *B01J 35/006* (2013.01); *B01J 35/1014* (2013.01); *B01J 35/1019* (2013.01); *F01N 3/10* (2013.01); *B01D 2255/1023* (2013.01); *B01D 2255/2065* (2013.01); *B01D 2255/908* (2013.01); *B01D 2255/9202* (2013.01); *B01D 2255/9207* (2013.01); *B01D 2258/014* (2013.01)

(58) Field of Classification Search
CPC ............ B01J 23/10; B01J 23/44; B01J 23/54; B01J 23/63

USPC .......... 502/304, 333, 339, 349–351, 355, 439
See application file for complete search history.

(56) References Cited

U.S. PATENT DOCUMENTS

| | | | | |
|---|---|---|---|---|
| 5,593,647 A * | 1/1997 | Kirby | ................... | B01D 53/945 29/890 |
| 5,993,762 A | 11/1999 | Rajaram et al. | | |
| 8,057,745 B2 * | 11/2011 | Toyoda | ................ | B01D 53/945 422/171 |
| 8,211,824 B2 * | 7/2012 | Akamine | ............. | B01D 53/945 502/302 |
| 8,465,711 B2 * | 6/2013 | Ikeda | ................... | B01D 53/945 423/213.5 |
| 8,546,296 B2 * | 10/2013 | Yabuzaki | ............. | B01D 53/945 423/213.5 |
| 8,697,600 B2 * | 4/2014 | Nobukawa | ........... | B01D 53/945 502/302 |
| 8,808,653 B2 * | 8/2014 | Mikita | ................. | B01D 53/945 423/213.5 |
| 8,912,116 B2 * | 12/2014 | Akamine | ............. | B01D 53/945 502/302 |
| 2008/0269046 A1 * | 10/2008 | Minoshima | .......... | B01D 53/945 502/304 |
| 2009/0304564 A1 | 12/2009 | Hilgendorff et al. | | |
| 2010/0004122 A1 * | 1/2010 | Hori | ....................... | F01N 3/2828 502/303 |
| 2010/0126154 A1 | 5/2010 | Klingmann et al. | | |
| 2012/0122667 A1 * | 5/2012 | Matsueda | ............ | B01D 53/945 502/240 |
| 2012/0122672 A1 * | 5/2012 | Matsueda | ............ | B01D 53/945 502/303 |
| 2014/0038812 A1 * | 2/2014 | Hori | ....................... | B01J 23/002 502/304 |

FOREIGN PATENT DOCUMENTS

| | | |
|---|---|---|
| JP | 6-219721 | 8/1994 |
| JP | 10-277394 | 10/1998 |
| JP | 2005-224792 | 8/2005 |
| JP | 2007-000835 | 1/2007 |
| JP | 2010-510884 | 4/2010 |
| JP | 2010-521302 | 6/2010 |
| JP | 2011-140011 | 7/2011 |

* cited by examiner

*Primary Examiner* — Cam N. Nguyen
(74) *Attorney, Agent, or Firm* — The Webb Law Firm

(57) ABSTRACT

Provided is a palladium catalyst in which palladium (Pd) is used as a catalyst active component, and particularly a novel palladium catalyst which can purify CO and THC with high efficiency even under a fuel-rich atmosphere having a high space velocity (SV). Proposed is a palladium catalyst having a substrate and a catalyst layer that contains palladium acting as a catalyst active component, an inorganic porous material acting as a catalyst support and ceria ($CeO_2$) particles acting as a promoter component, in which a mass ratio ($Pd/CeO_2$) of a content of the palladium in the catalyst layer to a content of the ceria particles in the catalyst layer is 0.0014 to 0.6000.

20 Claims, No Drawings

PALLADIUM CATALYST

CROSS-REFERENCE TO RELATED APPLICATIONS

This application is the United States national phase of International Application No. PCT/JP2013/053614 filed Feb. 15, 2013, and claims priority to Japanese Patent Application No. 2012-080847 filed Mar. 30, 2012, the disclosures of which are hereby incorporated in their entirety by reference.

TECHNICAL FIELD

The present invention relates to a catalyst capable of being used to purify an exhaust gas emitted from an internal combustion engine of, for instance, a two- or four-wheeled vehicle, and more particularly to a palladium catalyst in which a main component of catalyst active species is palladium (Pd) among them.

BACKGROUND ART

Exhaust gases of vehicles using gasoline as a fuel include harmful components such as total hydrocarbons (THC), carbon monoxide (CO), and nitrogen oxides (NOx). As such, it is necessary to purify each harmful component using a catalyst by oxidizing THC into water and carbon dioxide, by oxidizing CO into carbon dioxide, and by reducing NOx to nitrogen.

As catalysts for treating such exhaust gases (hereinafter referred to as "exhaust gas purification catalysts"), three-way catalysts (TWC) enabling reduction-oxidation of CO, THC, and NOx are used. The three-way catalysts are typically mounted at an intermediate position of an exhaust pipe between an engine and a muffler in a converter type.

As such a three-way catalyst, a catalyst adapted to support a noble metal on a refractory oxide porous body having a wide specific surface area, for instance, an alumina porous body having a wide specific surface area, and to support this on either a substrate, for instance, a monolithic substrate made of a refractory ceramic or metal honeycomb structure, or refractory particles is known.

In this type of three-way catalysts, the noble metal functions to oxidize hydrocarbon in the exhaust gas into carbon dioxide and water, to oxidize carbon monoxide into carbon dioxide, and to reduce nitrogen oxide to nitrogen, and a ratio of air to fuel (air fuel ratio) is preferably held constant (at a theoretical air fuel ratio) in order to effectively produce catalysis for both of the reactions at the same time.

In internal combustion engines of, for instance, vehicles, the air fuel ratio is greatly changed depending on driving conditions such as acceleration, deceleration, low-speed driving, and high-speed driving. As such, the air fuel ratio (A/F) that varies according to operational conditions of the engine is constantly controlled using an oxygen sensor (zirconia). However, since it is difficult for the catalyst to sufficiently exert purification catalyst performance in the case of merely controlling the air fuel ratio (A/F) in this way, a function of controlling the air fuel ratio (A/F) is also required of a catalyst layer itself. Thus, for the purpose of preventing a decrease in purification performance of the catalyst, which is caused due to a change in the air fuel ratio, using a chemical action of the catalyst itself, a catalyst in which a promoter is added to a noble metal that is a catalyst active component is used.

As such a promoter, a promoter (called an "OSC material") having an oxygen storage capacity (OSC) to release oxygen in a reduction atmosphere and to absorb oxygen in an oxidation atmosphere is known. For example, ceria (cerium oxide, $CeO_2$) or ceria-zirconia composite oxide is known as the OSC material having the oxygen storage capacity.

Ceria ($CeO_2$) has a characteristic that can desorb and absorb attached oxygen and lattice oxygen in the cerium oxide depending on a level of an oxygen partial pressure in the exhaust gas and widens a range (window) of the air fuel ratio capable of efficiently purifying CO, THC, and NOx. In other words, when the exhaust gas has reducibility, the cerium oxide desorbs the oxygen ($CeO_2 \rightarrow CeO_{2-x}+(x/2)O_2$), and feeds the oxygen into the exhaust gas, thereby causing an oxidation reaction. On the other hand, when the exhaust gas has oxidizability, the cerium oxide reversely takes the oxygen in an oxygen defect ($CeO_{2-x}+(x/2)O_2 \rightarrow CeO_2$), and reduces an oxygen concentration in the exhaust gas, thereby causing a reduction reaction. In this way, the cerium oxide fulfills a function as a buffer that decreases a change in the oxidizability and reducibility of the exhaust gas, and functions to maintain the purification performance of the catalyst.

Further, the ceria-zirconia composite oxide in which zirconia is dissolved in this ceria is added to many catalysts as the OSC material, because the oxygen storage capacity (OSC) thereof is better.

With regard to the three-way catalysts using the OSC material such as ceria or ceria-zirconia composite oxide, the following inventions have hitherto been disclosed.

For example, in JP H06-219721 A, a catalyst that uniformly contains metal particles in metal oxide particles and that contains any of Pt, Pd, Rh, and Au as a noble metal and $CeO_2$ as a metal oxide is disclosed as a metal-metal oxide catalyst having a novel catalyst characteristic.

In JP 2011-140011 A, a CO oxidation catalyst that supports Pd on $CeO_2$ support particles and is formed by heat treatment in an oxidizing atmosphere at a temperature ranging from 850 to 950° C. is disclosed as a CO oxidation catalyst capable of showing CO oxidation activity over a wide range of temperatures including a low temperature.

In JP H10-277394 A, a vehicle exhaust gas catalyst in which a) active aluminum oxide that is fine and stabilized, b) at least one fine oxygen storage component, c) additional cerium oxide, zirconium oxide, and barium oxide that have high dispersivity, and d) one catalytic film layer made of palladium as the only catalytic noble metal are formed on an inactive substrate is disclosed as a catalyst that has high conversion rates of hydrocarbon, carbon monoxide, and nitrogen oxide and excellent heat and aging resistance and contains only palladium.

In JP 2005-224792 A, as a three-way catalyst in which Pd is supported on a support material based on a composite oxide containing Al, Ce, Zr, Y, and La, a catalyst in which a ratio BA of the total number B of moles of Ce, Zr, Y, and La atoms to the number A of moles of Al atoms in the support material is 1/48 or more and 1/10 or less, and Pd has a part in a metal state and the balance in an oxide state is disclosed.

In JP 2010-521302, a three-way catalyst configured to apply strontium oxide or barium oxide to a surface of a catalyst layer made of aluminum oxide, cerium/zirconium mixed oxide catalytically activated by rhodium, and cerium/zirconium mixed oxide catalytically activated by with palladium is disclosed.

During which two- and four-wheeled vehicles are driving, an oxygen excess condition (lean burn condition) on which an oxidation reaction is effective and a fuel excess condition (rich burn condition) on which a reduction reaction is favorable repeatedly alternate with each other in response to driving conditions. For this reason, it is necessary for the catalyst for the exhaust gas to exert predetermined catalyst performance or higher under any of the oxygen excess condition (lean burn condition) and the fuel excess condition (rich burn condition). Especially, in the case of the two-wheeled vehicle, there is a tendency to raise the number of rotations of an engine to drive the vehicle under a fuel-rich atmosphere. As such, there is a need to exert the catalyst performance, especially, under a fuel-rich atmosphere having a high space velocity (SV).

In the existing three-way catalysts, platinum (Pt) and rhodium (Rh) among noble metals have been frequently used as the catalyst active components. However, since these noble metals are extremely expensive, there is a need to develop a palladium catalyst in which less expensive palladium (Pd) is used a lot.

However, when palladium (Pd) is used as the catalyst active component, this has a problem that purification rates of carbon monoxide (CO) and total hydrocarbons (THC) are lowered, especially, under a fuel-rich atmosphere having a high space velocity (SV).

Therefore, an object of the invention is to provide, with regard to a palladium catalyst in which palladium (Pd) is used as a catalyst active component, a new palladium catalyst capable of efficiently purifying carbon monoxide (CO) and total hydrocarbons (THC) under a fuel-rich atmosphere having a high space velocity (SV).

SUMMARY OF THE INVENTION

The invention proposes a palladium catalyst containing palladium acting as a catalyst active component, an inorganic porous material acting as a catalyst support, and ceria ($CeO_2$) particles acting as a promoter component, wherein a mass ratio ($Pd/CeO_2$) of a content of the palladium contained in the catalyst to a content of the ceria particles contained in the catalyst is 0.0014 to 0.6000.

The invention also proposes a palladium catalyst having a substrate and a catalyst layer containing palladium acting as a catalyst active component, an inorganic porous material acting as a catalyst support, and ceria ($CeO_2$) particles acting as a promoter component, wherein a mass ratio ($Pd/CeO_2$) of a content of the palladium contained in the catalyst layer to a content of the ceria particles contained in the catalyst layer is 0.0014 to 0.6000.

The palladium catalyst which the invention proposes is adapted to support palladium (Pd) on ceria particles at a predetermined rate, so that it is possible to efficiently purify CO and THC under a fuel-rich atmosphere having a high space velocity (SV).

In the invention, the term "high space velocity (SV)" refers particularly to a region where SV is equal to or more than 45,000. Further, the term "under a fuel-rich atmosphere" refers to A/F<14.6 and O/R<1, where O/R refers to a ratio of an oxidizing gas to a reducing gas, which is described in SAE paper No. 950256 (O/R=Oxidizing gas/Reducing gas).

Further, the term "palladium catalyst" refers to a main component of catalyst active components, that is, a catalyst in which a component accounting for equal to or more than 50 mass % of the catalyst active components is palladium (Pd), and is also abbreviated herein as a "Pd catalyst."

DETAILED DESCRIPTION AND BEST MODE(S) FOR CARRYING OUT THE INVENTION

Hereinafter, a best mode for carrying out the invention will be described. The invention is not, however, limited to embodiments to be described below.

A palladium catalyst according to the invention may be a palladium catalyst as a catalyst composition containing palladium as a catalyst active component, an inorganic porous material as a catalyst support, and ceria ($CeO_2$) particles as a promoter component, or a palladium catalyst having a substrate and a catalyst layer that contains palladium as a catalyst active component, an inorganic porous material as a catalyst support, and ceria ($CeO_2$) particles as a promoter component.

Here, as an example of the embodiment of the invention, a palladium catalyst (called the "present Pd catalyst") as a catalyst structure having a substrate and a catalyst layer containing palladium, an inorganic porous material, and ceria particles, and in addition to them, a stabilizer as needed will be described.

A specific configuration of the present Pd catalyst may include a catalyst structure configured by forming a catalyst layer, for instance, by wash-coating a catalyst composition containing palladium, an inorganic porous material, ceria particles, and as needed, a stabilizer on a surface of a substrate presenting, for instance, a honeycomb (monolithic) structure.

Hereinafter, each of the aforementioned constituent materials constituting the present Pd catalyst will be described.

<Substrate>

A material of the substrate used for the present Pd catalyst may include refractory materials, such as ceramics, and metal materials.

The materials of the ceramic substrate may include refractory ceramic materials, for instance, cordierite, cordierite-alpha alumina, silicon nitride, zircon mullite, spodumene, alumina-silica magnesia, zircon silicate, sillimanite, magnesium silicate, zircon, petalite, alpha alumina, and alumino-silicates.

The materials of the metal substrate may include refractory metals, for instance, other proper corrosion resistant alloys based on stainless steel or iron.

A shape of the substrate may include a honeycomb shape, a pellet shape, and a sphere shape.

As a honeycomb material, for instance, cordierite materials such as ceramics are generally used in many cases. Further, a honeycomb made of a metal material such as ferritic stainless steel may also be used.

In the case of using the honeycomb substrate, use may be made of a monolithic substrate having numerous fine gas flow passages, that is, numerous fine gas channels, inside the substrate in parallel, for instance, such that a fluid flows inside the substrate. In this case, a catalyst layer may be formed on an inner wall surface of each channel of the monolithic substrate by coating such as wash-coating a catalyst composition.

<Catalyst Layer>

The catalyst layer of the present Pd catalyst is a layer containing palladium, an inorganic porous material, and ceria particles, and in addition to them, a stabilizer and other components as needed.

However, in addition to the catalyst layer, one or two other catalyst layers may be stacked in a vertical direction, or another catalyst layer may be formed in a flow direction of an exhaust gas.

The catalyst layer is preferably contained at a rate of 40 g to 300 g per 1 liter substrate.

If the content of the catalyst layer is equal to or more than 40 g per 1 liter substrate, it is not necessary to significantly reduce a solid concentration when the catalyst composition is converted into a slurry, and it is possible to secure adhesiveness with a honeycomb substrate (for example, 100 cells) having large through-holes. In contrast, if the content of the catalyst layer is equal to or less than 300 g, even a honeycomb substrate (for example, 1200 cells) having small through-holes allows the through-holes thereof to be inhibited from being clogged.

From such a viewpoint, the content of the catalyst layer is still more preferably equal to or more than 60 g or equal to or less than 250 g per 1 liter substrate, and most preferably equal to or more than 80 g or equal to or less than 200 g.

(Inorganic Porous Material)

Since a bonding force between the substrate and the catalyst active component is not typically so strong, it is difficult to secure a sufficient supported amount even when the catalyst active component is directly supported on the substrate. Thus, to cause a sufficient amount of catalyst active component to be supported on the surface of the substrate in a highly dispersed state, it is preferable to cause the catalyst active component to be supported on a particulate inorganic porous material having a high specific surface area, to coat the inorganic porous material, on which the catalyst active component is supported, on the surface of the substrate, and to thereby form the catalyst layer.

The inorganic porous material may include a porous body made of a compound selected from the group consisting of, for instance, silica, alumina, and titania compounds, and more particularly a porous body made of a compound selected from the group consisting of, for instance, alumina, silica, silica-alumina, alumino-silicates, alumina-zirconia, alumina-chromia, and alumina-ceria.

As alumina among them, alumina whose specific surface area is larger than 50 $m^2/g$, for instance, γ-, δ-, θ-, or α-alumina, may be used. Especially, γ- or θ-alumina is preferably used. Alternatively, to enhance heat resistance, a trace of La may also be contained for alumina.

(Ceria Particles)

The present Pd catalyst contains ceria (cerium dioxide, $CeO_2$) particles as promoters having an oxygen storage capacity (OSC).

When palladium is supported on the ceria particles at a predetermined rate, carbon monoxide (CO) and total hydrocarbons (THC) are allowed to be efficiently purified even under a fuel-rich atmosphere having a high space velocity (SV). This can be considered that, since a Pd—O—Ce bond is formed by supporting palladium on the ceria particles at a predetermined blending rate thereby forming a high oxidation state, carbon monoxide (CO) and hydrocarbons (THC) can be efficiently purified even under a fuel-rich atmosphere having a high space velocity (SV).

From such a viewpoint, the ceria particles preferably account for equal to or more than 50 mass % of the OSC material which the present Pd catalyst, particularly the Pd-containing catalyst layer, contains. Among them, the ceria particles preferably account for, equal to or more than 70 mass %, more preferably equal to or more than 80 mass %, and most preferably equal to or more than 90 mass % (including 100 mass %).

A specific surface area of the ceria particles preferably ranges from 20 to 130 $m^2/g$ of the Brunauer, Emmett, and Teller (BET) specific surface area.

As is evident from results of Examples and Comparative Examples to be described below, it is turned out that, if the specific surface area of the ceria particles on which palladium (Pd) is supported is within a predetermined range, it is possible to still more efficiently purify CO and THC under a fuel-rich atmosphere having a high space velocity (SV).

Accordingly, the specific surface area of the ceria particles on which palladium (Pd) is preferably 20 to 130 $m^2/g$ of the BET specific surface area, more preferably equal to or more than 40 $m^2/g$ or equal to or less than 120 $m^2/g$, and most preferably equal to or more than 85 $m^2/g$.

The ceria particles are preferably contained in the catalyst layer at a rate of 5 to 85 mass %.

If the content of the ceria particles in the catalyst layer is equal to or more than 5 mass %, it is possible to sufficiently purify CO and THC under a fuel-rich atmosphere. In contrast, if the content of the ceria particles is equal to or less than 85 mass %, it is possible to more reliably secure adhesiveness with the substrate.

From such a viewpoint, the content of the ceria particles is preferably contained in the catalyst layer at a rate of 5 to 85 mass %, more preferably a rate of equal to or more than 5 mass % or equal to or less than 40 mass %, and most preferably a rate of equal to or more than 13 mass %.

(Catalyst Active Component)

The present Pd catalyst is characterized in that a main component of a metal having catalytic activity is palladium (Pd) in order to cut the overall price of the catalyst.

Since palladium (Pd) is the main component of the metal having the catalytic activity, it is necessary that palladium (Pd) accounts for at least 50 mass % or more in the metal having the catalytic activity. Especially, palladium (Pd) preferably accounts for equal to or more than 80 mass % of the metal having the catalyst activity, and more preferably equal to or more than 90 mass % (including 100 mass %).

Thus, in the present Pd catalyst, a mass ratio ($Pd/CeO_2$) of the content of palladium contained in the catalyst layer to the content of the ceria particles is preferably 0.0014 to 0.6000.

As palladium is contained at such a ratio, CO and THC can be efficiently purified under a fuel-rich atmosphere having a high space velocity (SV).

Accordingly, the mass ratio ($Pd/CeO_2$) of the content of palladium contained in the catalyst layer to the content of the ceria particles is preferably 0.0014 to 0.6000, more preferably equal to or more than 0.0050 or equal to or less than 0.4000, still more preferably equal to or more than 0.0250 or equal to or less than 0.3600, and most preferably equal to or less than 0.1000.

Further, palladium (Pd) forming the main component of the catalyst active components preferably has an average particle size of 1.0 nm to 83.0 nm.

As is evident from results of Examples and Comparative Examples to be described below, it is turned out that, if the size of palladium (Pd) is within a predetermined range, CO and THC can be still more efficiently purified under a fuel-rich atmosphere having a high space velocity (SV).

Accordingly, palladium (Pd) forming the main component of the catalyst active components preferably has the average particle size of 1.0 nm to 83.0 nm, more preferably equal to or more than 2.0 nm or equal to or less than 40.0 nm, and most preferably equal to or more than 2.0 nm or equal to or less than 30.0 nm.

Meanwhile, metals having the catalyst activity other than palladium (Pd) may include platinum, rhodium, gold, silver, ruthenium, iridium, nickel, cerium, cobalt, copper, osmium, and strontium. Among them, a more preferable component to be contained in the present Pd catalyst other than palladium (Pd) may include, for instance, platinum.

A content of palladium in the present Pd catalyst preferably has a rate of 0.18 to 4.50 g per 1 liter substrate. As palladium is contained in such a range, CO and THC can be efficiently purified under a fuel-rich atmosphere having a high space velocity (SV).

However, if an amount of palladium is increased, this causes a rise in product price, and thus it is difficult to use a great deal of palladium.

From such a viewpoint, the content of palladium in the present Pd catalyst is still more preferably equal to or more than 0.3 g or equal to or less than 3.0 g per 1 liter substrate, and most preferably equal to or less than 1.0 g.

Further, palladium is preferably contained in the catalyst layer at a rate of 0.12 to 3.00 mass %. As palladium is contained in such a range, CO and THC can be efficiently purified under a fuel-rich atmosphere having a high space velocity (SV). However, if an amount of palladium is increased, this causes a rise in product price, and thus it is difficult to use a great deal of palladium.

From such a viewpoint, the palladium is preferably contained in the catalyst layer at a rate of 0.12 to 3.00 mass %, more preferably equal to or more than 0.20 mass % or equal to or less than 2.00 mass %, and most preferably equal to or less than 0.667 mass %.

(Stabilizer and Other Components)

The present Pd catalyst may also contain a stabilizer for the purpose of inhibiting PdOx from being reduced to a metal under a fuel-rich atmosphere.

This kind of stabilizer may include, for instance, an alkaline earth metal or an alkali metal. Especially, the stabilizer may be selected from one or two or more of metals selected from the group consisting of magnesium, barium, calcium, and strontium, and preferably strontium and barium. Among them, barium is preferred in terms of the fact that a temperature at which PdOx is reduced is the highest, that is, that PdOx is rarely reduced.

The present Pd catalyst may contain known added components such as a binder component.

As the binder component, an inorganic binder, for instance, an aqueous solution such as an alumina sol, a silica sol, or a zirconia sol may be used. When calcined, these may take a form of an inorganic oxide.

In addition, the present Pd catalyst may also contain zirconia as the binder component. In this case, zirconia acting as the promoter component and zirconia acting as the binder component may be distinguished by a technique for, for instance, observing them under an electron microscope. In other words, this is because zirconia acting as the promoter component is dispersed at the same portion as the ceria particle or around the ceria particle, while zirconia acting as the binder component is not dispersed only at the same portion as the ceria particle or around the ceria particle.

<Manufacturing Method>

An example for manufacturing the present Pd catalyst may include a method of mixing an inorganic porous material, ceria ($CeO_2$) particle powder or an aqueous Ce salt, a binder, and water, agitating the mixture into a slurry using, for instance, a ball mill, then immersing a substrate such as a ceramic honeycomb structure into the slurry, and pulling up and calcining the resultant, thereby forming a catalyst layer on a surface of the substrate.

However, the method for manufacturing the present Pd catalyst may employ any known methods, and is not limited to the aforementioned example.

DESCRIPTION OF TERMINOLOGY

In the case of being expressed herein as the phase "X to Y" (X and Y are arbitrary numbers), unless otherwise stated, the phase includes the meaning of "preferably more than X" or "preferably less than Y" along with the meaning "equal to or more than X and equal to or less than Y."

Further, in the case of being expressed as the phrase "equal to or more than X" (X is an arbitrary number) or the phase "equal to or less than Y" (Y is an arbitrary number), the phrase also includes the intention of being "preferably more than X" or "preferably less than Y."

EXAMPLES

Hereinafter, the invention will be described in more detail based on Examples and Comparative Examples below.

Example 1

5 parts by mass of porous γ-alumina, 85 parts by mass of ceria particle powder (20 $m^2/g$ of the BET specific surface area), 10 parts by mass of an alumina sol as an inorganic binder when calculated in terms of an oxide, and 150 parts by mass of deionized water were weighted and mixed with a ball mill, thereby obtaining a slurry.

φ40 mm×L60 mm (100 cells): A metal honeycomb substrate that had a support volume of 0.0754 L and was made of stainless steel was impregnated into the slurry and was pulled up. A surplus slurry was blown off by an air gun, and then the honeycomb substrate was calcined under an air atmosphere at 600° C. for 3 hours, thereby forming a coating layer. At this time, an amount of the coating layer was 150 g per 1 L honeycomb substrate.

The honeycomb substrate with the coating layer obtained in this way was impregnated into a Pd nitrate solution. Extra droplets were blown off by an air gun, and the honeycomb substrate was calcined under an air atmosphere at 600° C. for 3 hours, thereby forming a catalyst layer to obtain a Pd catalyst. At this time, an amount of the catalyst layer was 150 g per 1 L of the honeycomb substrate, and an amount of Pd was 0.18 g per 1 L of the honeycomb substrate.

Incidentally, amounts of Pd, Rh, and $CeO_2$ in Tables represent blending amounts when the catalyst is manufactured, but are the same values as contents when measured after the catalyst is manufactured (which is also equally applied to the other Examples and Comparative Examples).

Example 2

35 parts by mass of porous γ-alumina, 55 parts by mass of ceria particle powder (20 $m^2/g$ of the BET specific surface area), 10 parts by mass of an alumina sol as an inorganic binder when calculated in terms of an oxide, and 150 parts by mass of deionized water were weighted and mixed with a ball mill, thereby obtaining a slurry.

As in Example 1, a honeycomb substrate with a coating layer and a Pd catalyst were made using the slurry. However, an amount of Pd was 0.18 g per 1 L of the honeycomb substrate.

Example 3

50 parts by mass of porous γ-alumina, 40 parts by mass of ceria particle powder (40 $m^2/g$ of the BET specific surface area), 10 parts by mass of an alumina sol as an inorganic binder when calculated in terms of an oxide, and 150 parts by mass of deionized water were weighted and mixed with a ball mill, thereby obtaining a slurry.

As in Example 1, a honeycomb substrate with a coating layer and a Pd catalyst were made using the slurry. However, an amount of Pd was 0.30 g per 1 L of the honeycomb substrate.

Example 4

63 parts by mass of porous γ-alumina, 27 parts by mass of ceria particle powder (87 $m^2/g$ of the BET specific surface area), 10 parts by mass of an alumina sol as an inorganic binder when calculated in terms of an oxide, and 150 parts by mass of deionized water were weighted and mixed with a ball mill, thereby obtaining a slurry.

As in Example 1, a honeycomb substrate with a coating layer and a Pd catalyst were made using the slurry. However, an amount of Pd was 1.00 g per 1 L of the honeycomb substrate.

Example 5

63 parts by mass of porous γ-alumina, 27 parts by mass of ceria particle powder (100 m²/g of the BET specific surface area), 10 parts by mass of an alumina sol as an inorganic binder when calculated in terms of an oxide, and 150 parts by mass of deionized water were weighted and mixed with a ball mill, thereby obtaining a slurry.

As in Example 1, a honeycomb substrate with a coating layer and a Pd catalyst were made using the slurry. However, an amount of Pd was 1.00 g per 1 L of the honeycomb substrate.

Example 6

63 parts by mass of porous γ-alumina, 27 parts by mass of ceria particle powder (55 m²/g of the BET specific surface area), 10 parts by mass of an alumina sol as an inorganic binder when calculated in terms of an oxide, and 150 parts by mass of deionized water were weighted and mixed with a ball mill, thereby obtaining a slurry.

As in Example 1, a honeycomb substrate with a coating layer and a Pd catalyst were made using the slurry. However, an amount of Pd was 1.00 g per 1 L of the honeycomb substrate.

Example 7

63 parts by mass of porous γ-alumina, 27 parts by mass of ceria particle powder (63 m²/g of the BET specific surface area), 10 parts by mass of an alumina sol as an inorganic binder when calculated in terms of an oxide, and 150 parts by mass of deionized water were weighted and mixed with a ball mill, thereby obtaining a slurry.

As in Example 1, a honeycomb substrate with a coating layer and a Pd catalyst were made using the slurry. However, an amount of Pd was 1.00 g per 1 L of the honeycomb substrate.

Example 8

63 parts by mass of porous γ-alumina, 27 parts by mass of ceria particle powder (85 m²/g of the BET specific surface area), 10 parts by mass of an alumina sol as an inorganic binder when calculated in terms of an oxide, and 150 parts by mass of deionized water were weighted and mixed with a ball mill, thereby obtaining a slurry.

As in Example 1, a honeycomb substrate with a coating layer and a Pd catalyst were made using the slurry. However, an amount of Pd was 1.00 g per 1 L of the honeycomb substrate.

Example 9

63 parts by mass of porous γ-alumina, 27 parts by mass of ceria particle powder (94 m²/g of the BET specific surface area), 10 parts by mass of an alumina sol as an inorganic binder when calculated in terms of an oxide, and 150 parts by mass of deionized water were weighted and mixed with a ball mill, thereby obtaining a slurry.

As in Example 1, a honeycomb substrate with a coating layer and a Pd catalyst were made using the slurry. However, an amount of Pd was 1.00 g per 1 L of the honeycomb substrate.

Example 10

77 parts by mass of porous γ-alumina, 13 parts by mass of ceria particle powder (111 m²/g of the BET specific surface area), 10 parts by mass of an alumina sol as an inorganic binder when calculated in terms of an oxide, and 150 parts by mass of deionized water were weighted and mixed with a ball mill, thereby obtaining a slurry.

As in Example 1, a honeycomb substrate with a coating layer and a Pd catalyst were made using the slurry. However, an amount of Pd was 2.00 g per 1 L of the honeycomb substrate.

Example 11

85 parts by mass of porous γ-alumina, 5 parts by mass of ceria particle powder (120 m²/g of the BET specific surface area), 10 parts by mass of an alumina sol as an inorganic binder when calculated in terms of an oxide, and 150 parts by mass of deionized water were weighted and mixed with a ball mill, thereby obtaining a slurry.

As in Example 1, a honeycomb substrate with a coating layer and a Pd catalyst were made using the slurry. However, an amount of Pd was 2.70 g per 1 L of the honeycomb substrate.

Example 12

87 parts by mass of porous γ-alumina, 3 parts by mass of ceria particle powder (130 m²/g of the BET specific surface area), 10 parts by mass of an alumina sol as an inorganic binder when calculated in terms of an oxide, and 150 parts by mass of deionized water were weighted and mixed with a ball mill, thereby obtaining a slurry.

As in Example 1, a honeycomb substrate with a coating layer and a Pd catalyst were made using the slurry. However, an amount of Pd was 3.00 g per 1 L of the honeycomb substrate.

Example 13

85 parts by mass of porous γ-alumina, 5 parts by mass of ceria particle powder (129 m²/g of the BET specific surface area), 10 parts by mass of an alumina sol as an inorganic binder when calculated in terms of an oxide, and 150 parts by mass of deionized water were weighted and mixed with a ball mill, thereby obtaining a slurry.

As in Example 1, a honeycomb substrate with a coating layer and a Pd catalyst were made using the slurry. However, an amount of Pd was 3.75 g per 1 L of the honeycomb substrate.

Example 14

85 parts by mass of porous γ-alumina, 5 parts by mass of ceria particle powder (127 m²/g of the BET specific surface area), 10 parts by mass of an alumina sol as an inorganic binder when calculated in terms of an oxide, and 150 parts by mass of deionized water were weighted and mixed with a ball mill, thereby obtaining a slurry.

As in Example 1, a honeycomb substrate with a coating layer and a Pd catalyst were made using the slurry. However, an amount of Pd was 4.50 g per 1 L of the honeycomb substrate.

Comparative Example 1

2 parts by mass of porous γ-alumina, 90 parts by mass of ceria particle powder (16 m²/g of the BET specific surface area), 8 parts by mass of an alumina sol as an inorganic binder when calculated in terms of an oxide, and 150 parts by mass of deionized water were weighted and mixed with a ball mill, thereby obtaining a slurry.

As in Example 1, a honeycomb substrate with a coating layer and a Pd catalyst were made using the slurry. However, an amount of Pd was 0.05 g per 1 L of the honeycomb substrate.

Comparative Example 2

2 parts by mass of porous γ-alumina, 90 parts by mass of ceria particle powder (4 m²/g of the BET specific surface area), 8 parts by mass of an alumina sol as an inorganic binder when calculated in terms of an oxide, and 150 parts by mass of deionized water were weighted and mixed with a ball mill, thereby obtaining a slurry.

As in Example 1, a honeycomb substrate with a coating layer and a Pd catalyst were made using the slurry. However, an amount of Pd was 0.18 g per 1 L of the honeycomb substrate.

Comparative Example 3

89.5 parts by mass of porous γ-alumina, 0.5 parts by mass of ceria particle powder (130 m²/g of the BET specific surface area), 10 parts by mass of an alumina sol as an inorganic binder when calculated in terms of an oxide, and 150 parts by mass of deionized water were weighted and mixed with a ball mill, thereby obtaining a slurry.

As in Example 1, a honeycomb substrate with a coating layer and a Pd catalyst were made using the slurry. However, an amount of Pd was 0.60 g per 1 L of the honeycomb substrate.

Comparative Example 4

90 parts by mass of porous γ-alumina, 10 parts by mass of an alumina sol as an inorganic binder when calculated in terms of an oxide, and 150 parts by mass of deionized water were weighted and mixed with a ball mill, thereby obtaining a slurry.

As in Example 1, a honeycomb substrate with a coating layer and a Pd catalyst were made using the slurry. However, an amount of Pd was 6.00 g per 1 L of the honeycomb substrate.

Reference Example 1

56.6 parts by mass of porous γ-alumina, 20 parts by mass of ceria powder (19 m²/g of the BET specific surface area), 13.4 parts by mass of zirconia powder, 10 parts by mass of an alumina sol as an inorganic binder when calculated in terms of an oxide, and 150 parts by mass of deionized water were weighted and mixed with a ball mill, thereby obtaining a slurry.

φ40 mm×L60 mm (100 cells): A metal honeycomb substrate that had a support volume of 0.0754 L and was made of stainless steel was impregnated into the slurry and was pulled up. A surplus slurry was blown off by an air gun, and then the honeycomb substrate was calcined under an air atmosphere at 600° C. for 3 hours, thereby forming a coating layer. At this time, an amount of the coating layer was 150 g per 1 L honeycomb substrate.

The honeycomb substrate with the coating layer obtained in this way was impregnated into a mixed solution of Pd nitrate and Rh nitrate. Extra droplets were blown off by an air gun, and the honeycomb substrate was calcined under an air atmosphere at 600° C. for 3 hours. Thus, 1.50 g of Pd and 0.15 g of Rh were supported per 1 L of the honeycomb substrate, thereby obtaining a Pd/Rh catalyst.

<Method of Evaluating Pd Particle Sizes>

With respect to the Pd catalysts obtained in Examples 1 to 14, Comparative Examples 1 to 4, and Reference Example 1, a specific surface area per 1 g of Pd present in the catalyst layer was measured according to a CO pulse adsorption method (T. Takeguchi, S. Manabe, R. Kikuchi, K. Eguchi, T. Kanazawa, S. Matsumoto, Applied Catalysis A: 293(2005) 91.), that is a known method, and a value obtained by calculating a diameter when a Pd particle was defined as a sphere from the number of Pd particles and a Pd density was defined as a Pd average particle size (which is represented as a "Pd particle size" in Tables).

<Method of Evaluating BET Specific Surface Area>

A BET specific surface area of the ceria powder used in each of Examples 1 to 14, Comparative Examples 1 to 4, and Reference Example 1 was measured by a gas adsorption method using a QUADRASORBSI device manufactured by Yuasa Ionics Inc.

<Method of Evaluating Simplex Purification Performance (T50-CO, T50-HC)>

A simulated exhaust gas illustrated in Table 1 below was forced to flow through the Pd catalysts (φ40×L60-100 cpsi) obtained in Examples 1 to 14, Comparative Examples 1 to 4, and Reference Example 1, and outlet gas components at 100° C. to 500° C. were measured using a CO/HC analyzer. Temperatures (T50-CO, T50-HC) reaching a 50% purification rate were obtained from the obtained measurement results.

Then, in comparison with purification performance of Reference Example 1, the examples of showing poor purification performance were evaluated as "X" (poor), and the examples of showing good purification performance were evaluated as "◯" (good). Further, the examples of showing better purification performance were evaluated as "◯◯", and the examples of showing still better purification performance were evaluated as "◯◯◯".

TABLE 1

| ■ A/F = 14.6 Gas | Total flow rate: 25 L/min Concentration | |
|---|---|---|
| N2-1 | Bal | |
| CO2 | 14 | % |
| AIR | 0.485 | % |
| NO | 500 | ppm |
| CO—H2-free | 0.725 | % |
| CO(30%)/H2(10%) | — | % |
| HC (propylene) | 1200 | ppmC |
| CO/H2 RICH1 | — | % |
| C2 LEAN1 | — | % |
| HC RICH2 (propane) | — | ppmC |
| NO LEAN2 | — | ppm |
| H2O | 10 | % |

TABLE 2

| | Pd amount (wt %) | Rh amount (g/L) | CeO$_2$ amount (wt %) | Pd/CeO$_2$ ratio | Pd particle size (nm) | CeO2-BET (m2/g) | Performance evaluation CO-T50 (°C.) | Performance evaluation HC-T50 (°C.) | Determination |
|---|---|---|---|---|---|---|---|---|---|
| Comparative Example 1 | 0.033 | 0 | 90 | 0.0003 | 0.5 | 16 | 431 | 453 | X |
| Comparative Example 2 | 0.123 | 0 | 90 | 0.0013 | 1.0 | 4 | 368 | 380 | X |
| Example 1 | 0.123 | 0 | 85 | 0.0014 | 1.0 | 20 | 360 | 362 | ○ |
| Example 2 | 0.123 | 0 | 55 | 0.0022 | 1.0 | 20 | 360 | 365 | ○ |
| Example 3 | 0.203 | 0 | 40 | 0.0050 | 4.0 | 40 | 356 | 358 | ○○ |
| Example 5 | 0.667 | 0 | 27 | 0.0250 | 2.0 | 100 | 335 | 346 | ○○○ |
| Example 9 | 0.667 | 0 | 27 | 0.0250 | 23.0 | 94 | 346 | 349 | ○○○ |
| Example 4 | 0.667 | 0 | 27 | 0.0250 | 31.0 | 87 | 348 | 341 | ○○○ |
| Example 8 | 0.667 | 0 | 27 | 0.0250 | 33.0 | 85 | 350 | 347 | ○○○ |
| Example 7 | 0.667 | 0 | 27 | 0.0250 | 40.0 | 63 | 349 | 348 | ○○○ |
| Example 6 | 0.667 | 0 | 27 | 0.0250 | 50.0 | 55 | 345 | 355 | ○○ |
| Example 10 | 1.333 | 0 | 13 | 0.1000 | 29.0 | 111 | 348 | 355 | ○○ |
| Example 11 | 1.803 | 0 | 5 | 0.3600 | 40.0 | 120 | 345 | 345 | ○○○ |
| Example 12 | 2.000 | 0 | 5 | 0.4000 | 75.0 | 130 | 348 | 358 | ○○ |
| Example 13 | 2.500 | 0 | 5 | 0.5000 | 81.0 | 129 | 353 | 360 | ○ |
| Example 14 | 3.000 | 0 | 5 | 0.6000 | 83.0 | 127 | 358 | 365 | ○ |
| Comparative Example 3 | 0.400 | 0 | 0.5 | 0.8000 | 75.0 | 130 | 370 | 378 | X |
| Comparative Example 4 | 4.000 | 0 | 0 | — | 92.0 | — | 367 | 373 | X |
| Reference Example 1 | 1.000 | 0.1 | 20 | 0.0500 | 82.0 | 19 | 362 | 368 | X |

To sum up Examples above and results of tests performed heretofore by the inventor(s), it was found that, when palladium acting as the catalyst active component was supported on the ceria (CeO$_2$) particles acting as the promoter component at a predetermined rate, that is, such that the mass ratio (Pd/CeO$_2$) of the content of palladium contained in the catalyst to the content of ceria particles contained in the catalyst was 0.0014 to 0.6000, it was possible to efficiently purify CO and THC under a fuel-rich atmosphere having a high space velocity (SV).

Further, it was also found that, in this case, palladium acting as the catalyst active component was preferably palladium having an average particle size of 1.0 nm to 83.0 nm, and the ceria (CeO$_2$) particles acting as the promoter component were preferably ceria (CeO$_2$) particles having a BET specific surface area of 20 to 130 m$^2$/g.

The invention claimed is:

1. A palladium catalyst for purifying an exhaust gas containing palladium acting as a catalyst active component, an inorganic porous material acting as a catalyst support, and ceria (CeO$_2$) particles acting as a promoter component,
    wherein the palladium catalyst for purifying an exhaust gas has a constitution which the palladium is supported on the ceria particles (CeO$_2$); and
    a mass ratio (Pd/CeO$_2$) of a content of the palladium contained in the catalyst to a content of the ceria particles contained in the catalyst 0.0014 to 0.4000.

2. The palladium catalyst for purifying an exhaust gas according to claim 1, wherein the palladium acting as the catalyst active component is palladium having an average particle size of 1.0 nm to 83.0 nm.

3. The palladium catalyst for purifying an exhaust gas according to claim 2, wherein the ceria (CeO$_2$) particles acting as the promoter component are ceria (CeO$_2$) particles having a BET specific surface area of 20 to 130 m$^2$/g.

4. The palladium catalyst for purifying an exhaust gas according to claim 3, wherein the ceria particles are contained in the catalyst at a rate of 5 to 85 mass%.

5. The palladium catalyst for purifying an exhaust gas according to claim 3, wherein the palladium is contained in the catalyst at a rate of 0.12 to 3.00 mass%.

6. The palladium catalyst for purifying an exhaust gas according to claim 2, further containing barium.

7. The palladium catalyst for purifying an exhaust gas according to claim 1, wherein the ceria (CeO$_2$) particles acting as the promoter component are ceria (CeO$_2$) particles having a BET specific surface area of 20 to 130 m$^2$/g.

8. The palladium catalyst for purifying an exhaust gas according to claim 4, wherein the ceria particles are contained in the catalyst at a rate of 5 to 85 mass%.

9. The palladium catalyst for purifying an exhaust gas according to claim 4, wherein the palladium is contained in the catalyst at a rate of 0.12 to 3.00 mass%.

10. The palladium catalyst for purifying an exhaust gas according to claim 7, further containing barium.

11. The palladium catalyst for purifying an exhaust gas according to claim 1, wherein the ceria particles are contained in the catalyst at a rate of 5 to 85 mass%.

12. The palladium catalyst for purifying an exhaust gas according to claim 11, wherein the palladium is contained in the catalyst at a rate of 0.12 to 3.00 mass%.

13. The palladium catalyst for purifying an exhaust gas according to claim 1, wherein the palladium is contained in the catalyst at a rate of 0.12 to 3.00 mass%.

14. The palladium catalyst for purifying an exhaust gas according to claim 1, further containing barium.

15. A palladium catalyst for purifying an exhaust gas having a substrate and a catalyst layer containing palladium acting as a catalyst active component, an inorganic porous material acting as a catalyst support, and ceria (CeO$_2$) particles acting as a promoter component,
    wherein the catalyst layer has a constitution which the palladium is supported on the ceria particles (CeO$_2$); and
    a mass ratio (Pd/CeO$_2$) of a content of the palladium contained in the catalyst layer to a content of the ceria particles contained in the catalyst layer is 0.0014 to 0.4000.

16. The palladium catalyst for purifying an exhaust gas according to claim 2, wherein the palladium acting as the catalyst active component is palladium having an average particle size of 1.0 nm to 83.0 nm.

17. The palladium catalyst for purifying an exhaust gas according to claim 15, wherein the ceria ($CeO_2$) particles acting as the promoter component are ceria ($CeO_2$) particles having a BET specific surface area of 20 to 130 $m^2/g$.

18. The palladium catalyst for purifying an exhaust gas according to claim 15, wherein the ceria particles are contained in the catalyst layer at a rate of 5 to 85 mass%.

19. The palladium catalyst for purifying an exhaust gas according to claim 2, wherein the palladium is contained in the catalyst layer at a rate of 0.12 to 3.00 mass%.

20. The palladium catalyst for purifying an exhaust gas according to claim 15, further containing barium.

* * * * *